T. R. TIMBY.
ATTACHMENT FOR COOKING-STOVES.

No. 173,690. Patented Feb. 15, 1876.

WITNESSES
Chas. J. Gooch
LeBlond Burdett

INVENTOR
Theodore R. Timby
By Knight, Attorneys

N. PETERS, PHOTO-LITHOGRAPHER, WASHINGTON, D.C.

UNITED STATES PATENT OFFICE.

THEODORE R. TIMBY, OF TARRYTOWN, NEW YORK.

IMPROVEMENT IN ATTACHMENTS TO COOKING-STOVES.

Specification forming part of Letters Patent No. 173,690, dated February 15, 1876; application filed January 31, 1876.

*To all whom it may concern:*

Be it known that I, THEODORE R. TIMBY, of Tarrytown, in the county of Westchester and State of New York, have invented a new and useful Improvement in Attachments for Cooking Stoves and Ranges, of which the following is a specification:

This invention relates to my attachment for cooking stoves and ranges which is the subject-matter of United States Letters Patent No. 168,809, dated October 11, 1875, the same comprising, in the preferred form, a pivotal support to adapt the attached griddle or other utensil to swing horizontally, and provision for sliding the handle horizontally back and forth through the pivotal support, for moving the utensil from place to place on the stove or range, and for supporting the same in elevated position or off the edge of the top plate.

The object of the present invention is to provide for removing the utensil with facility by lifting it free from the part which is attached to the stove or range, and at the same time to preserve the provision for sliding the handle back and forth, which materially increases the scope of the adjustability of the attachment.

This invention consists in a handle of peculiar construction, operating in combination with a portion of the pivotal support which is adapted thereto, as hereinafter set forth.

Figure 1:
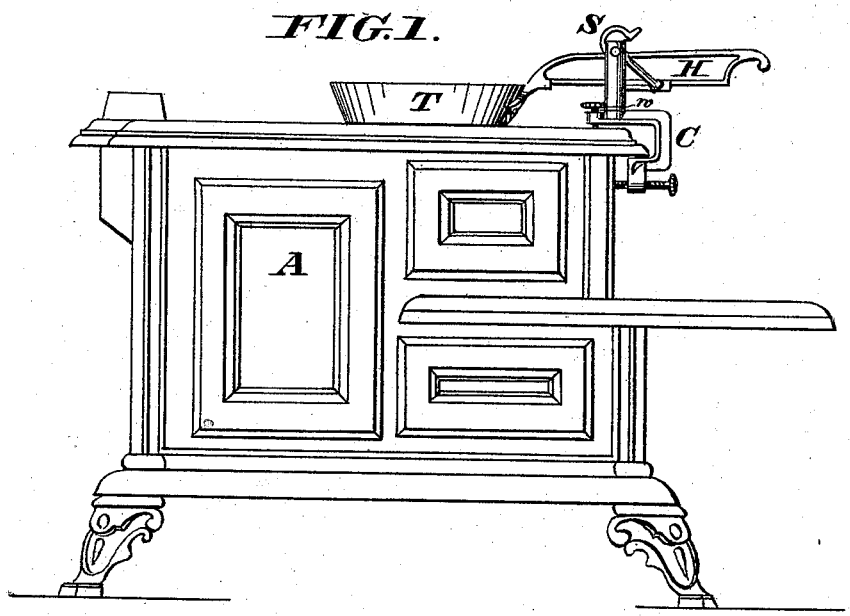
Figure 2:
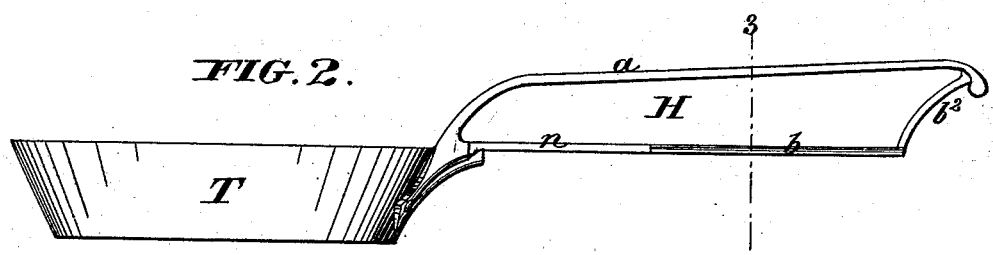
Figure 3:
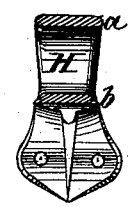
Figure 4:
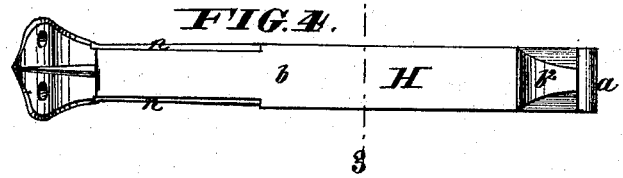
Figure 5:
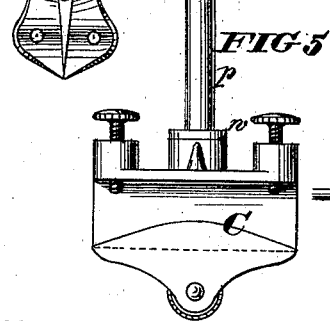
Figure 6:
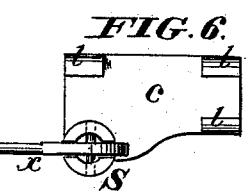

Figure 1 is a side elevation of a cooking-stove provided with an attachment illustrating this invention. Fig. 2 is an elevation of the griddle or pan on a larger scale. Fig. 3 is a cross-section, and Fig. 4 a bottom view, of the improved handle detached. Fig. 5 is an elevation of the lower part of the pivotal support. Fig. 6 is a plan view, and Fig. 7 an elevation, of the upper part of the pivotal support.

Like letters of reference indicate corresponding parts in the several figures.

Figure 7:
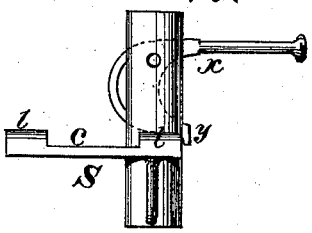

A represents an ordinary cooking-stove or kitchen-range, and T a circular pan of swaged sheet metal, adapted to fit over the pot-holes, and to be used for a variety of purposes. H represents a handle of peculiar construction, which is attached to the pan T; S, a pivotal support adapted to receive the handle, and C a clamp for attaching the whole to the edge of the top plate of the stove or range at the front or either side. This clamp is constructed in accordance with the specification of United States Letters Patent issued to me under date of January 25, 1876, and does not, therefore, require general description here. The pivotal support S is formed partly on the clamp C, as shown, the latter being provided with a vertical pivot, $p$, and a step, $s$. This step determines the height of the bottom of the pan when lowered. To provide a higher step, when this is required by the style of the stove or range, one or more washers, $w$, Figs. 1 and 5, will accompany the attachment. The pan should slide lightly on the top of the stove or range, and swing horizontally in this plane. The upper part of the pivotal support fits over the pivot, and is provided with a lever-eccentric, $x$, to engage with the top of the pivot for elevating the pan, as in the original attachment; and this eccentric is constructed with a single continuous curve, terminating in a stop-lug, $y$, to adapt it to securely support the pan in elevated position. For attaching the handle H to the movable part of the pivotal support, the latter is provided with a horizontal shelf, $c$, having upwardly-projecting undercut lugs $l$, arranged as shown in Figs. 6 and 7. The handle is constructed with a conveniently shaped and inclined gripe-bar or handle proper, $a$, and a horizontal slide-bar, $b$, beneath it, the two being united at the outer end of the handle by a curved brace, $b^2$. The main portion of the slide-bar $b$ has parallel edges, and is adapted to fit under and slide between the undercut lugs $l$, as illustrated. Notches $n\ n'$ at the inner end of the handle, matching the lugs, provide for introducing and detaching the handle by simply dropping or lifting the same vertically, when the notches coincide with the lugs. Provision is thus made for detaching the pan quickly and with the utmost facility, so as to adapt it to be removed to the table or elsewhere, and replaced at pleasure. A light, cool, and graceful handle is, at the same time, formed, which is adapted to be cast in one part. The handle is attached to the pan by rivets.

Instead of the described pan, one of a different style, or a griddle or other utensil, may be provided with the improved handle, and the latter may be attached to the utensil in any approved way. In an inferior modification, the separate gripe-bar may be dispensed with, and the notched slide-bar itself constitute the handle proper.

I claim as new—

The handle H, constructed with a gripe-bar or handle proper, $a$, and a horizontal bottom bar, $b$, adapted to slide between undercut lugs, and constructed with notches $n$, to escape said lugs in one position of the handle, to adapt the latter to be disengaged vertically from the pivotal support, in the manner set forth.

THEODORE R. TIMBY.

Witnesses:
ABNER C. THOMAS,
JAS. L. EWIN.